United States Patent [19]
Riley et al.

[11] 3,907,711
[45] Sept. 23, 1975

[54] CRYSTALLINE ZEOLITE SYNTHESIS PRETREATMENT

[75] Inventors: Kenneth L. Riley, Baton Rouge, La.; Dale D. Maness, Austin, Tex.

[73] Assignee: Exxon Research and Engineering Company, Linden, N.J.

[22] Filed: July 18, 1973

[21] Appl. No.: 380,094

[52] U.S. Cl. .............................. 252/455 Z; 423/328
[51] Int. Cl.² ..................... B01J 29/06; C01B 33/28
[58] Field of Search ......... 252/455 Z; 423/112, 118, 423/328

[56] References Cited
UNITED STATES PATENTS

| | | | |
|---|---|---|---|
| 3,037,843 | 6/1962 | Mason | 423/118 |
| 3,321,521 | 5/1967 | Kerr | 252/455 Z |
| 3,565,788 | 2/1971 | Foucher, Jr. et al. | 252/455 X |
| 3,701,629 | 10/1972 | Maness | 423/328 X |

*Primary Examiner*—Carl F. Dees
*Attorney, Agent, or Firm*—A. H. Krumholz; R. J. Ott

[57] ABSTRACT

A process for improving the conversion of certain crystalline aluminosilicate zeolites into crystalline aluminosilicate zeolites having an entirely different crystal structure and a lower $SiO_2/Al_2O_3$ mole ratio is described. Pretreatment with certain acids and/or complexing agents is the basic method utilized to promote these conversions, preferably the conversion of clinoptilolite to faujasite.

12 Claims, No Drawings

CRYSTALLINE ZEOLITE SYNTHESIS PRETREATMENT

FIELD OF THE INVENTION

The present invention relates to a novel method for the preparation of crystalline aluminosilicate zeolites suitable for use in various hydrocarbon conversion processes. More particularly, the present invention relates to the conversion of various crystalline aluminosilicate zeolites into new crystalline aluminosilicates having a lower silica/alumina mole ratio but superior adsorption and catalytic properties than the starting crystalline aluminosilicate materials. Specifically, this conversion is obtained by treating the initial crystalline aluminosilicate with certain cation-leaching solutions prior to their treatment with alkali metal hydroxide solutions, such that a new crystalline aluminosilicate zeolite is formed which is distinguishable from the starting material by having a distinct X-ray diffraction pattern containing new X-ray lines which did not appear in the X-ray diffraction pattern of the starting crystalline zeolites. The crystalline aluminosilicate zeolites formed by the process of the present invention have a crystal structure entirely different from that of the starting crystalline zeolite materials.

Another embodiment of the present invention relates to the use of the zeolite materials formed by the process of the present invention in various hydrocarbon conversion processes. Specifically, in one aspect thereof, the crystalline zeolites formed by the process of the present invention are embedded in an inorganic oxide matrix, these zeolites having been subjected to ion exchange procedures whereby the alkali metal content thereof is substantially reduced.

BACKGROUND OF THE INVENTION

Crystalline aluminosilicate zeolites structurally consist basically of an open three-dimensional framework of $SiO_4$ and $AlO_4$ tetrahedra. Such tetrahedra are cross-linked by the sharing of oxygen atoms, so that the ratio of oxygen atoms to the total of the aluminum and silicon atoms is equal to 2. The negative electro-valence of tetrahedra containing aluminum is balanced by the inclusion within the crystals of cations, such as alkali or alkaline earth metal ions.

These crystalline zeolites have a crystal structure containing channels of molecular dimensions. The interstitial spaces are generally originally occupied by water of hydrogen. After at least partial dehydration, these zeolites may be utilized as efficient adsorbents whereby adsorbate molecules are retained within these interstitial spaces. The interstitial dimensions of openings in the crystal lattice limit the size and shape of the molecules that can be absorbed. A separation of a mixture of various molecules, based upon molecular dimensions, wherein certain molecules are adsorbed by the zeolite while others are excluded from admission is thereof possible. It is such a characteristic of many crystalline zeolites that has led to their designation as "molecular sieves."

Molecular sieve materials are usually porous, the pores having higher uniform molecular dimensions, generally between about 3 and about 15 Angstrom Units in diameter. Each crystal of molecular sieve material contains literally billions of tiny cavities or cages interconnected by channels of uniform diameter. The size and portion of the metal ions in the crystal control the effective diameter of the interconnecting channels. As initially prepared and generally as found naturally, the metal of the aluminosilicate is predominately an alkali metal, usually sodium. Such alkali metal is subject to base exchange with a wide variety of other metal ions.

In addition to their extensive use as adsorbents for hydrocarbon separation processes and the like, it has recently been found that crystalline aluminosilicate zeolites, particularly after cation exchange as described above to reduce alkali metal oxide contents, are valuable catalytic materials for various processes, particularly hydrocarbon conversion processes.

In general, the chemical formula of anhydrous crystalline aluminosilicate zeolites expressed in terms of moles may be represented as:

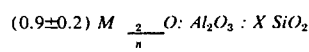

$$(0.9 \pm 0.2) M_{\frac{2}{n}} O : Al_2O_3 : X SiO_2$$

wherein M is a metal cation, generally an alkali metal such as sodium or potassium as found in the natural form or as initially synthesized; $n$ is the valence of the metal cation; and X is a number from about 1.5 to about 12, said value being dependent upon the particular type of zeolite. Included among the well-known naturally occurring zeolites are clinoptilolite, mordenite, faujasite, chabazite, gmelinite, analcime, erionite, etc.

Additionally, various types of synthetic crystalline zeolites have been prepared, including synthetic faujasites known as zeolites X and Y, synthetic mordenite, etc.

The various zeolites are distinguishable by their X-ray diffraction patterns. Such X-ray analyses are described in detail in Ser. No. 104,745, to Harry E. Robson, filed Jan. 7, 1971.

There are various processes well-known in the art for producing these synthetic crystalline aluminosilicate zeolites. The so-called gel synthesis process usually involves crystallization of the zeolites from reaction mixtures containing suitable sources of alkali metal oxide, silica, alumina and water. The proportions of these various ingredients will determine the type of zeolite obtained, as well as its crystallinity and the yield of final product.

Generally, alumina may be added in the form of sodium aluminate, alumina sol, alumina trihydrate and the like; silica, in the form of sodium silicate, silica gel, silica sol, etc., silica sol being particularly preferred, and the alkali metal oxide as sodium hydroxide, sodium aluminate, sodium silicate, etc. These reactants are then put into solution and thoroughly mixed at ambient temperature, heated to a temperature generally of from about 80° to about 150°C., and held at that temperature for a sufficient time for the crystallized product to form. Pressure must be applied at temperatures above 100°C. to prevent substantial loss of water from the reaction mixture, and at about 100°C., typical optimum crystallization times range from 48 to about 240 hours.

Following crystallization, the zeolite crystals are filtered and preferably thoroughly washed until the wash water has a pH of about 10.5 to 11. The crystals may then be dried and activated.

These known methods for preparing synthetic crystalline aluminosilicates are deficient in the following aspects:

The gel synthesis process is capable of making high-silica products, but requires expensive raw materials, particularly where silica sol is employed. In addition to the high cost of raw materials, this process requires a long crystallization procedure involving both cooling and heating, which limits production.

Recently, a novel process has been discovered whereby crystalline aluminosilicates are prepared from other crystalline aluminosilicates using a single process employing treatment with alkali metal hydroxide solutions, as described in Ser. No. 104,745, noted above, and as promoted by the addition of certain soluble salt solutions, as described in Ser. No. 159,053, filed July 1, 1971.

SUMMARY OF THE INVENTION

In accordance with the present invention, it has been discovered that the preparation of crystalline aluminosilicate zeolites by treatment of an initial crystalline alumininosilicate zeolite, characterized by a particular $SiO_2/Al_2O_3$ mole ratio and a particular X-ray diffraction pattern distinguishing its particular crystal structure, with an aqueous alkali metal hydroxide solution, may be improved by the addition of a pretreatment step whereby the initial crystalline aluminosilicate zeolite is contacted with certain cation-leaching solutions prior to treatment with the alkali metal hydroxide solution. The cation-leaching solutions include certain acid solutions and solutions of particular complexing agents, which effect the removal of certain synthetis-inhibiting cations from the initial crystalline aluminosilicate zeolites. By utilizing the process of the present invention, the final crystalline aluminosilicate zeolites produced, having a lower silica/alumina mole ratio than that of the starting material, and exhibiting completely different final crystal structures therefrom, characterized by having X-ray diffraction patterns containing X-ray lines which did not appear in the diffraction pattern of the original crystalline zeolite, are prepared in improved yields and with a higher degree of crystallinity.

DETAILED DESCRIPTION

The crystalline aluminosilicate zeolite treatment of the present invention is based upon the discovery that the presence of certain cations in the initial crystalline aluminosilicate zeolite when it is contacted with the aqueous alkali metal hydroxide solution tend to inhibit the formation of the new crystalline aluminosilicate zeolite product. Therefore, the present invention provides a pretreatment procedure, comprising contacting the initial crystalline aluminosilicate zeolite, prior to treatment with the aqueous alkali metal hydroxide solution, with a cation-leaching solution, generally comprising certain acids and/or complexing agents, for removal of these inhibiting cations, so that products of improved yield and/or crystallinity are formed thereby. Thus, the crystalline aluminosilicate zeolite treatment of the present invention primarily consists of contacting the initial crystalline aluminosilicate zeolite with such a cation-leaching solution prior to contact with an aqueous alkali metal hydroxide solution, which itself may also contain certain soluble salt solutions. Preferably, the cation-leaching solutions will comprise certain acid solutions and/or solutions of certain complexing agents, and subsequent to this pretreatment step. Preferably, NaOH will be utilized along with a soluble halide compound.

The particular cations which have been discovered to inhibit the synthesis of crystalline aluminosilicate zeolites according to the invention as described in Ser. No. 104,745, noted above, include materials such as calcium, potassium, zinc, rubidium, cesium, strontium, barium, copper and mercury cations. While all of these cations have been found to inhibit this synthesis, it has been found that zinc and potassium cations are particularly significant inhibitors of this synthesis procedure.

Thus, when utilizing crystalline aluminosilicate zeolites, particularly certain naturally-occurring crystalline aluminosilicate zeolites, including materials such as clinoptilolite, mordenite, heulandite, erionite, chabazite, phillipsite, analcime, etc., these materials will contain varying amounts of various metal cations, including these particular metal cations which have been found to inhibit the preparation of a final crystalline aluminosilicate zeolite by the process of the present invention.

The removal or leaching of these cations from the initial crystalline aluminosilicate zeolite may be accomplished by the use of certain acid solutions. Specifically, acids having a pKa of from 5.0 to –10, preferably from 3.0 to –9.0, are utilized, and in particular, acids, such as HCl, $HNO_3$ and $H_2SO_4$, are most preferred, particularly at concentrations of from 0.1 N to 5.0 N, and preferably from 0.5 N to 3.0 N. Most preferably HCl is employed, in a solution ranging from 0.25 N up to about 4.0 N, preferably from 0.5 N up to about 2.5 N, and most preferably from 1.8 N up to about 2.2 N. The acid solution utilized must be strong enough to effect the removal of these inhibiting cations therefrom, but they must not be so strong as to substantially damage the structure of the initial crystalline aluminosilicate zeolite.

Alternatively, this pretreatment step effecting the removal of these inhibiting cations from the initial crystalline aluminosilicate zeolite may be accomplished by the utilization of certain complexing agents. These complexing agents must have an affinity for the inhibiting cation in question, e.g. the $K^+$, $Ca^{++}$ or $Zn^{++}$ cation, and should exhibit appreciable solubility in water. Further, it is preferred that the complexing agent chosen will not decompose in either acid or basic media, or at elevated temperatures. Particularly preferred examples of such complexing agents will thus include various forms of ethylendiaminetetraacetic acid (EDTA), such as tetrasodium ($Na_4Y$) EDTA, disodium ($Na_2H_2Y \cdot Z-H_2O$) EDTA and the acid form of EDTA ($H_4Y$), with the former being preferred.

There are, however, other classes of such compounds which also exhibit these properties to a degree such that they are quite useful in the present process. These include the polyethers, particularly compounds such as dimethoxyethane and 1,2 dimethoxypropane, the amino, hydroxy and oxo acids, such as pyruvic acid, malic acid, lactic acid, m-hydroxybenzoic acid, β-leucine, and certain chelating tertiary polyamines, as described in U.S. Pat. No. 3,705,200.

The contacting of the cation-leaching solution with the initial crystalline aluminosilicate zeolite may be carried out in any conventional manner. The acid pretreatment is preferably conducted by refluxing the initial crystalline aluminosilicate with a solution of the particular cationleaching compound to be so employed. Preferably this acid pretreatment will be carried out using about 200 to 800 ml of 0.25 N to 4.0 N HCl per 40 grams of source material, preferably 550 ml to 650 ml of 0.5 N to 2.5 N HCl per 40 grams of source material, for a period of from about 1 to 6 hours, preferably 3.5 to 4.5 hours, and at a temperature of from 80° to 100°C., preferably at reflux.

The removal of inhibiting cations by complexing agents can be accomplished by slurrying the zeolite several times with a given volume of a solution of the complexing agent of a specified concentration for a specific time interval. Preferably about 40 grams of source material is slurried with about 100 to 400 ml of disodium EDTA or trisodium EDTA (or other suitable agents such as the acid form of EDTA, etc.) whose concentration may range from about 0.01 molar to 0.2 molar from about 2 to 45 minutes. This procedure may be repeated from 1 to 4 times. Most preferably 40 grams of source material is slurried with about 150 to 250 mls of one of the sodium salts of EDTA or the acid form of EDTA, at a concentration ranging from about 0.05 molar to 0.15 molar for from about 5 to 15 minutes. Most preferably this procedure is repeated 2 or 3 times.

Following this pretreatment step of the present invention, the thus-treated initial crystalline aluminosilicate zeolite will be contacted with an alkali metal hydroxide solution, preferably also containing a soluble salt solution, as described in Ser. Nos. 104,745 and 159,053, noted hereinabove. It is thus preferred that high concentrations of alkali solutions will be utilized in this portion of the instant invention, preferably from 10 to 50% NaOH, and most preferably from 20 to 35% NaOH solution. The pretreated initial crystalline aluminosilicate zeolite is blended with the alkali metal hydroxide solution and the soluble salt solution, and is so treated for from about 1 to 100 hours, preferably from 2 to 24 hours and most preferably from 4 to 6 hours, and from about 25° to 150°C., preferably 80° to 130°C., and most preferably from 90° to 110°C.

The ratio of alkali metal hydroxide to the initial crystalline zeolite utilized will be from above about 0.2 up to about 0.6 on a weight basis, preferably above about 0.2 up to about 0.5 and most preferably from about 0.22 to about 0.40 It is possible to utilize higher ratios of alkali metal hydroxide to zeolite than these, but such a treatment results in a crystalline zeolite product having lower, and thus less desirable, $SiO_2/Al_2O_3$ mole ratios.

The above-described caustic treatment results in a complete alteration of the crystal structure of the initial crystalline zeolite employed, and additionally extracts silica from the initial composition, thereby resulting in a lower $SiO_2/Al_2O_3$ mole ratio in the final zeolite as compared to the initial crystalline zeolite utilized. The severity of this caustic treatment may be regulated so as to control the difference in $SiO_2/Al_2O_3$ ratio between the starting zeolite and the final zeolite produced thereby. That is, within the limits of alkali metal hydroxide solution discussed above, it is possible to vary the concentration thereof in order to extract the varying amounts of $SiO_2$ therefrom, and thus alter the $SiO_2/Al_2O_3$ ratio of the final crystalline zeolite product obtained. Normally, between about 50% and 80% of the $SiO_2$ content of the initial zeolite will be extracted, preferably from 50 to 70% and most preferably from 55 to 60%.

The initial blending of initial crystalline zeolite with alkali metal hydroxide will be in solution, and the ratio of $H_2O/$ zeolite employed will be from between about 0.3 grams per gram to about 2.0 grams per gram, preferably from 0.5 to 1.5 grams per gram and most preferably from 0.9 to 1.1 grams per gram.

Additionally it has been found that the pretreatment often results in the undesired loss of $Al_2O_3$. To counteract this loss, $Al_2O_3$ may be added to the crystallization mixture in a suitable form, such as sodium aluminate. Normally, about 0.5 to 7 grams of $NaAlO_2$ per 10 grams of source material will be employed, preferably from about 1 to 4 grams.

If the final crystalline aluminosilicte zeolite produced by the process of the present invention is to be employed as a catalytic agent suitable in hydrocarbon conversion process such as catalytic cracking, hydrocracking, reforming, alkylation, isomerization, hydroisomerization, etc., it is desirable to have a major proportion, and in some cases substantially all, of the original alkali metal content of said zeolite removed from the zeolite by a base exchange operation. Preferably the zeolites will be subjected to cation exchange to reduce their alkali metal oxide content to less than about 5 wt. %, preferably less than about 3 wt. %, and most preferably less than about 2 wt. %. Conventionally, the alkali metal oxide content has been reduced by ion exchange treatment with solutions of ammonium salt, or salts of metal in Groups II to VIII of the Periodic Table or the rare earth metals, preferably metals in Groups II, III, IV, V, VI-B, VIII and the rare earth metals. Mixtures of these cations have also been employed. The most preferred cations for such use are ammonium, hydrogen and other hydrogen precursors, calcium, magnesium, zinc, pickel and the rare earths, with hydrogen and rare earth cations being particularly preferred.

For use in conversion processes with added hydrogen, such as hydrocracking, the hydrogen and/or rare earth forms of these zeolites are preferred, most preferably the hydrogen form. After suitable ion exchange, the modified crystalline zeolite is then composited or impregnated with a metallic hydrogenation component such as the platinum group metals, and including platinum, palladium, iridium, rhenium, nickel, cobalt, tungsten and molybdenum, with palladium or a combination of nickel and tungsten being particularly preferred.

These hydrogenation components may be so incorporated into the zeolite by treatment with a component such as a platinum or palladium salt or ammonium complex, e.g., platinous tetraamino dichloride, ammonium chloroplatinate, palladium chloride, etc. The amount of hydrogenation metal in the final catalyst is ordinarily from between about 0.1 to about 10 wt. %, preferably 0.5 to 2.0 wt. %, and more preferably 0.5 to 1.0 wt. %, based on the zeolite. Normally, the catalyst is then subjected to a heat treatment or a hydrogen treatment at elevated temperatures, e.g., 250° to 500°C., to reduce the platinum group metal, at least in part, to its elemental state. In addition, particularly when used in conversion processes such as hydrocracking and hydrodesulfurization, it may be desirable to employ the zeolite in admixture with an amorphous matrix material, examples of which include silica, alumina, or combinations of alumina with silica, magnesia, boria, and aluminum phosphate.

The catalytic conversions with added hydrogen, in which the above catalysts may be used are in general carried out at elevated temperatures of about 500° to 800°F., pressures of 500 to 2500 psig, liquid hourly space velocities of about 0.5 to 20 using hydrogen in amounts of about 1,000 to 8000 SCF/B feed. It is understood, however, that the selection of specific operating conditions within these broad ranges will depend upon the particular type of conversion which is desired, as well as the specific catalyst employed.

For use as adsorbents the final zeolites produced by the process of the present invention may be used under conventional conditions involving contact of the feed mixture with a fixed or moving bed of the adsorbent, generally at relatively low temperatures of, e.g., 75° to 200°F. and at atmospheric or superatmospheric pressures. These zeolites in general adsorb polar compounds such as alcohols, amines, ketones, esters and acids in preference to relatively non-polar compounds such as hydrocarbons. Aromatic hydrocarbons are generally adsorbed in preference to non-aromatic hydrocarbons of the same molecular size. When utilizing small pore diameter zeolites (e.g., having uniform pores of from 4 to 6 Angstroms) small molecular species are adsorbed in preference to larger molecules of the same chemical genus; and straight chain paraffins and olefins in preference to the branched chain species. Regeneration of the rich adsorbent may be effected by conventional means, as for example, steam stripping, vacuum desorption, displacement exchange, etc.

The initial crystalline aluminosilicate zeolites which may be employed in the process of the present invention may be represented by the following molar formula:

$$M_{2/n}O \cdot Al_2O_3 \cdot X\ SiO_2 \cdot WH_2O$$

wherein M is selected from the group consisting of metal cations and hydrogen, $n$ is a valence, and X is a number from about 5 to 12, and may be either large pore (e.g. having uniform pores of from about 6 to 15 Angstroms) or small pore molecular sieves. Preferably, the initial crystalline zeolite utilized will have a high $SiO_2/Al_2O_3$ ratio greater than about 6, more preferably greater than about 9 and most preferably greater than about 10, i.e. from about 10 to about 11. The preferred initial crystalline zeolites utilized are mordenite and clinoptilolite. The most preferred initial crystalline zeolite is clinoptilolite.

The final zeolite product produced by the processes of the present invention will have a $SiO_2/Al_2O_3$ mole ratio lower than that of the initial crystalline zeolite, generally from about 3 to about 5. Preferably this product will have a $SiO_2/Al_2O_3$ mole ratio above about 3, more preferably above about 3.5, and most preferably above about 4. It is most preferred to prepare a product having as high a $SiO_2/Al_2O_3$ mole ratio as possible, but this result may not always be obtainable while at the same time preparing a product of sufficient crystallinity to be useful.

DESCRIPTION OF THE PREFERRED EMBODIMENT

In an extremely important application of the present invention, when the initial crystalline zeolite employed is clinoptilolite, one of the most abundant naturally-occurring zeolites, treatment according to the process of the present invention results in the synthesis of the valuable zeolite faujasite.

Faujasite is a rare crystalline aluminosilicate mineral which, in its naturally occurring state, contains calcium ions and sodium ions in base-exchangeable positions. Naturally occurring faujasite has the approximate formula:

$$M_{2/n}O \cdot Al_2O_3 \cdot 5.1\ SiO_2$$

$$(Na_2, Ca, Mg)_{24}\ Al_{58}Si_{134}O_{384} \cdot 240H_2O$$

(W.H. Meier and D.H. Olson ["Zeolite Frameworks"] preprints pg. 386, paper No. 36 2nd Int'l Conference on Zeolites)

This material is described in detail in S.N. 104,745, noted above.

Clinoptilolite is an extremely abundant natural crystalline aluminosilicate zeolite which has not been found useful for purposes of the adsorption or catalysis of hydrocarbons heretofore. The reason for this is the very low surface area of this mineral, and its concomitant lack of adsorptive capacity, irrespective of its high silica to alumina molar ratio of about 11. A review of the characteristics of this material appears in The American Mineralogist, Vol. 45, 1960, at pages 351–369, in an article by F.A. Mumpton, which includes a review of the X-ray diffraction pattern of a clinoptilolite sample from Mt. Hector, California. Such a pattern is simplified in Table A.

TABLE A

| X-ray Diffraction Pattern for Clinoptilolite | | | |
|---|---|---|---|
| d | I | d | I |
| 9.00 | vs | 3.73 | vw |
| 7.94 | m | 3.55 | w |
| 6.77 | w | 3.46 | w |
| 6.64 | w | 3.42 | m |
| 5.91 | vw | 3.12 | w |
| 5.24 | w | 3.07 | w |
| 5.11 | vw | 3.04 | w |
| 4.69 | w | 2.97 | m |
| 4.48 | w | 2.87 | vw |
| 4.34 | w | 2.82 | w |
| 3.96 | vs | | |

EXAMPLE 1

In order to demonstrate that the presence of certain metallic cations have an adverse effect on the conversion of initial crystalline aluminosilicate zeolite to final crystalline aluminosilicate zeolites, a series of metal chlorides were added to a typical conversion formulae, and the crystallinity of the resultant zeolite product examined. Specifically, the most preferred such conversion, namely the use of the crystalline aluminosilicate zeolite clinoptilolite to prepare the extremely valuable synthetic crystalline aluminosilicate zeolite faujasite, was employed, and the results appear in Table 1.

In this example, a sample of clinoptilolite from Mt. Hector, California, was slurried in water and NaOH in the following proportions; 1:1:0.3 by weight, respectively. To this mixture sufficient metal chloride was added such that the total mixture contained 3% by wt. of $Cl^-$. The mixture was then heated to 100°C for approximately 16 hours to effect the crystallization of faujasite. The NaCl was taken as a reference standard since the sample of clinoptilolite employed contained sufficient $Na^+$ to produce NaCl upon the addition of the metal chloride. The results obtained clearly demonstrate that Ca, K, and Zn inhibit the crystalization of faujasite under these conditions.

TABLE I

| Metal Chloride Added to the Conversion Formula | % Crystallinity of Faujasite Product |
|---|---|
| $Na^+$ | 57% |
| $Ca^{++}$ | 16% |
| $K^+$ | 10% |
| $Zn^{++}$ | 0% |

EXAMPLE 2

In order to demonstrate how the pretreatment procedures of the present invention result in the preparation of highly improved zeolite products, a series of such conversions utilizing various clinoptilolite samples, both with and without the pretreatment procedure of the present invention were carried out. The precise procedure employed in part (A) of these examples involved the slurrying of 10 grams of the source material employed in 10 mls. of water, with 3 grams of NaOH (i.e. again, a weight ratio of 1:1:0.3), and 8.46 millimoles of NaCl (i.e. 0.3 grams of $Cl^-$, as NaCl). This slurry was then heated to 100°C for 16 hours to effect crystallization. The procedure employed in part (B) of these examples included the following proportions of the major reactants, i.e. 10 grams of the source material was slurried in 10.4 mls. of water, with 3 grams of NaOH to which was added 16.92 millimoles of NaCl and a sufficient amount of $NaAlO_2$ to produce a twofold excess of $Al_2O_3$ necessary to give a $SiO_2/Al_2O_3$ ratio of 9.8 (i.e. the $SiO_2/Al_2O_3$ ratio of the untreated clinoptilolite). Crystallization was effected by heating to 100°C for 7 hours. The source material employed had been refluxed with 600 mls of 2.N HCL for 4 hours. The reason for the addition of $NaAlO_2$ during the conversion in (B) was in order to maintain the $SiO_2/Al_2O_3$ ratio of the product, as in (A), since it was found that the HCl treatment, without the addition of excess aluminum, lowered the $SiO_2/Al_2O_3$ ratio, and prevented conversion from occurring. This was illustrated when a slurry having reactants in identical proportions to (A) was prepared employing a sample which had been refluxed in 600 mls. of 2.0N HCl for 4 hours. The resultant products demonstrated little, if any, conversion activity. The results, shown in Table II, include an analysis of the cation content of the treated and untreated clinoptilolites, and an analysis of the crystallinity of the faujasite products eventually prepared. A marked improvement in conversion activity results from the HCl pretreatment.

TABLE II

| Clinoptilolite Source | (A) Before HCl Pretreatment | | | | | (B) After HCl Pretreatment | | | | |
|---|---|---|---|---|---|---|---|---|---|---|
| | % Na | % K | % $Al_2O_3$ | % $SiO_2$ | Conv.* Activity | % Na | % K | % $Al_2O_3$ | % $SiO_2$ | Conv. Activity |
| Jersey Valley, lower | 2.46 | 2.46 | 10.3 | 68.1 | 36% | 1.83 | 0.79 | 9.1 | 79.6 | 106% |
| Red Canyon, Shoshone R. | 0.26 | 3.39 | 13.1 | 66.7 | 16% | 0.17 | 0.88 | 12.3 | 79.0 | 74% |
| Red Canyon, North | 0.81 | 1.61 | 8.6 | 70.4 | 0% | 0.27 | 0.42 | 4.8 | 88.8 | 127% |
| Elko Oil Shale Plant | 0.66 | 2.48 | 13.7 | 72.9 | Trace | 0.34 | 0.80 | 5.7 | 83.8 | 95% |

*As percent crystallinity of the faujasite products.

EXAMPLE 3

In order to further demonstrate the scope of the present invention, various other acid solutions and complexing agents were utilized in the process of the present invention. Table III contains a tabulation of these tests, an analysis of the cation content of the thustreated zeolites, as well as an analysis of the crystallinity of the clinoptilolite product eventually prepared.

TABLE III

| | INITIAL ZEOLITE SOURCE | PRETREATMENT UTILIZED | CRYSTAL-LINITY | % Na | %K | %$Al_2O_3$ | ANALYSIS %$SiO_2$ | %Fe | %CaO | %MgO |
|---|---|---|---|---|---|---|---|---|---|---|
| 1) | Mt. Hector, California | Starting Material | Good | 7.86 | 1.02 | 12.3 | 70.3 | 0.80 | 2.20 | 0.53 |
| 2) | Fish Creek Mountains | Starting Material | Good | 1.83 | 2.44 | 12.9 | 74.0 | 0.88 | 2.81 | 0.63 |
| 3) | Clinoptilolite - Fish Creek Mnts. North | Reflux for 4 hrs. with 600 mls. of 0.25 N HCl | Good | 0.73 | 2.37 | 11.3 | 79.5 | 0.67 | 1.49 | 0.36 |
| 4) | " | Reflux for 4 hrs. with 600 mls. of 3 N HCl | Good | 0.40 | 1.19 | 9.22 | 81.1 | 0.09 | 1.11 | 0.25 |
| 5) | " | Wash 3 times with 200 mls. of 0.1 M $Na_4$ EDTA solution for 5-10 mins. | Good | 3.33 | 1.88 | 12.0 | 80.1 | 0.73 | 0.98 | 0.51 |
| 6) | " | Wash 5 times with 200 mls. of 0.1M $Na_2$ $H_2$ EDTA solution for 5-10 mins. | Fair | 2.62 | 1.92 | 11.9 | 79.1 | 0.65 | 1.03 | 0.51 |
| 7) | Clinoptilolite - Fish Creek Mts. North | Reflux for 4 hrs. with 600 mls. of 0.1 M $Na_4$ EDTA solution | Good | 3.87 | 2.01 | 11.5 | 77.6 | 0.12 | 0.28 | |
| 8) | " | Reflux for 4 hrs. with 600 mls. of 2 N HCl + 0.01 moles EDTA | Good | 2.69 | 1.39 | 10.9 | 80.1 | 0.16 | 0.76 | 0.21 |
| 9) | " | Reflux for 4 hrs. with 600 mls. of 0.25 N HCl + 0.01 moles EDTA | Good | 2.50 | 1.70 | 11.0 | 79.3 | 0.26 | 1.19 | 0.25 |

TABLE III – Continued

| INITIAL ZEOLITE SOURCE | PRETREATMENT UTILIZED | CRYSTAL-LINITY | % Na | % K | % $Al_2O_3$ | % $SiO_2$ | % Fe | % CaO | % MgO |
| --- | --- | --- | --- | --- | --- | --- | --- | --- | --- |
| 10) " | Reflux for 4 hrs. with 600 mls. of $H_2O$ + 0.0272 moles EDTA | Good | 1.25 | 2.15 | 11.8 | 80.3 | 0.25 | 1.91 | 0.47 |
| 11) Clinoptilo- lite - Mt. Hector, Calif. | Reflux for 4 hrs. with 600 mls. of $H_2O$ + 0.0272 moles EDTA | Fair | 2.13 | 1.37 | 12.6 | 79.3 | 0.85 | 1.47 | 0.52 |

EXAMPLE 4

In order to demonstrate the significance of the strength of the acid pretreatment conducted according to the present invention, a series of such acid pretreatments were conducted while varying the normality of the acid solution employed, and the products were analyzed both for potassium content, in order to determine the degree of removal of inhibitor cations, and alumina content, in order to ascertain whether or not the source material had been damaged, i.e. alumina removed by the acid treatment. In each case, the same sample of clinoptilolite was refluxed for 4 hours in 600 mls of the HCl solution. The results are contained in Table IV below:

TABLE IV

| Normality of HCl Reflux Medium | Analysis of Product | |
| --- | --- | --- |
| | % K | % $Al_2O_3$ |
| No treatment | 2.44 | 12.9 |
| 0.25 N | 1.12 | 9.9 |
| 0.5 N | 0.54 | 11.1 |
| 1.0 N | 0.63 | 11.0 |
| 2.0 N | 0.91 | 10.0 |
| 3.0 N | 0.19 | 9.2 |
| 4.0 N | 1.00 | 8.6 |
| 5.0 N | 1.89 | 6.5 |

These results demonstrate that strong acid treatment of above about 4.0 N HCl did not effect good inhibitor ion removal, and resulted in significant damage to the zeolite structure. Treatment at about 0.5 N effected substantial K removal while not significantly affecting the zeolite structure.

What is claimed is:

1. In a method for preparing a crystalline aluminosilicate zeolite which comprises treating an initial crystalline aluminolilicate zeolite with an aqueous alkali metal hydroxide solution so that at least a portion of said initial crystalline aluminosilicate zeolite is converted into a final crystalline aluminosilicate zeolite having a lower $SiO_2/Al_2O_3$ mole ratio and a final crystal structure different from that of said initial crystalline zeolite, said difference in structure characterized by a final X-ray diffraction pattern containing X-ray lines which did not appear in the X-ray diffraction pattern of said initial crystalline zeolite, the improvement which comprises contacting said initial crystalline aluminosilicate zeolite with a cation-leaching solution prior to said treating with an aqueous alkali metal hydroxide solution, said cation-leaching solution being selected from the group consisting of solutions of acid, cationic complexing agents, and mixtures thereof.

2. The method of claim 1 wherein said acid comprises a mineral acid.

3. The method of claim 1 wherein said cationic complexing agent is ethylenediaminetetraacetic acid.

4. The method of claim 1 wherein said acid solution comprises HCl.

5. The method of claim 1 wherein said acid solution has a normality ranging from 0.1 to 5.0 N.

6. The method of claim 1 wherein said acid solution has a normality ranging from 0.5 to 3.0 N.

7. In a method for preparing a crystalline aluminosilicate zeolite which comprises treating an initial crystalline aluminosilicate zeolite with an aqueous alkali metal hydroxide solution so that at least a portion of said initial crystalline aluminosilicate zeolite is converted into a final crystalline aluminosilicate zeolite having a lower $SiO_2/Al_2O_3$ mole ratio and a final crystal structure different from that of said initial crystalline zeolite, said difference in structure characterized by a final X-ray diffraction pattern containing X-ray lines which did not appear in the X-ray diffraction pattern of said initial crystalline zeolite, the improvement which comprises contacting said initial crystalline aluminosilicate zeolite with a cation-leaching solution prior to said treating with an aqueous alkali metal hydroxide solution, said cation-leaching solution being selected from the group consisting of solutions of acids, cationic complexing agents, and mixtures thereof and being capable of removing a cation selected from the group consisting of potassium, calcium, zinc and mixtures thereof from the zeolite structure.

8. The method of claim 7 wherein said cationic complexing agent comprises a form of ethylenediaminetetraacetic acid.

9. The method of claim 7 wherein said contacting with said acid solution comprises refluxing said aluminosilicate with said acid solution for a period of from 1 to 6 hours.

10. The method of claim 7 wherein said contacting with said cationic complexing agent comprises slurrying said aluminosilicate with a 0.05 to 0.15 molar solution of said cationic complexing agent for a period of from 2 to 45 minutes.

11. In a method for preparing a crystalline aluminosilicate zeolite which comprises treating an initial crystalline aluminosilicate zeolite with an aqueous alkali metal hydroxide solution so that at least a portion of said initial crystalline aluminosilicate zeolite is converted into a final crystalline aluminosilicate zeolite having a lower $SiO_2/Al_2O_3$ mole ratio and a final crystal structure different from that of said initial crystalline zeolite, said difference in structure characterized by a final X-ray diffraction pattern containing X-ray lines which did not appear in the X-ray diffraction pattern of said initial crystalline zeolite, the improvement which comprises contacting said initial crystalline aluminosilicate zeolite with a cation-leaching solution selected from the group consisting of solutions of acids, cationic complexing agents, and mixtures thereof, in the presence of added alumina.

12. The method of claim 7 wherein said initial crystalline aluminosilicate zeolite is clinoptilolite.

* * * * *